United States Patent
Marechal

(10) Patent No.: US 8,496,220 B2
(45) Date of Patent: *Jul. 30, 2013

(54) FIXING SYSTEM FOR A SEAT, FOR EXAMPLE AN AIRCRAFT SEAT

(75) Inventor: Xavier Marechal, Paris (FR)

(73) Assignee: ATTAX, Carrieres sur Seine (FR)

( * ) Notice: Subject to any disclaimer, the term of this patent is extended or adjusted under 35 U.S.C. 154(b) by 226 days.

This patent is subject to a terminal disclaimer.

(21) Appl. No.: 12/832,504

(22) Filed: Jul. 8, 2010

(65) Prior Publication Data

US 2011/0006184 A1 Jan. 13, 2011

(30) Foreign Application Priority Data

Jul. 9, 2009 (FR) ...................................... 09 54762

(51) Int. Cl.
*A47B 97/00* (2006.01)
(52) U.S. Cl.
USPC ........ 248/503.1; 248/429; 248/509; 248/500; 244/118.5; 410/105; 296/65.15
(58) Field of Classification Search
USPC .... 248/503.1, 509, 429, 500, 503; 244/118.5, 244/118.6, 122 R; 410/105, 104, 77, 80; 296/65.15, 65.12
See application file for complete search history.

(56) References Cited

U.S. PATENT DOCUMENTS

| | | | | |
|---|---|---|---|---|
| 4,228,568 A * | 10/1980 | Frost et al. | ................. | 24/579.11 |
| 4,376,522 A | 3/1983 | Banks | | |
| 4,396,175 A * | 8/1983 | Long et al. | ................. | 248/503.1 |
| 4,771,969 A * | 9/1988 | Dowd | ......................... | 244/118.6 |
| 5,871,318 A * | 2/1999 | Dixon et al. | .................... | 410/105 |
| 6,505,805 B2 * | 1/2003 | Fuller | ............................. | 248/429 |
| 6,902,365 B1 * | 6/2005 | Dowty | ........................... | 410/105 |
| 7,438,511 B2 | 10/2008 | Legeay | | |
| 7,483,511 B2 * | 1/2009 | Bendahan et al. | .............. | 378/57 |
| 7,641,426 B2 * | 1/2010 | Stubbe | ......................... | 410/105 |
| 7,661,637 B2 * | 2/2010 | Mejuhas et al. | ............. | 248/157 |
| 7,837,145 B2 * | 11/2010 | Wodak | ........................ | 244/118.6 |
| 7,857,561 B2 * | 12/2010 | Mejuhas et al. | ............. | 410/105 |
| 8,066,248 B2 * | 11/2011 | Christensen | ................. | 248/429 |
| 2005/0116100 A1 * | 6/2005 | Pratt et al. | ................... | 244/118.5 |

(Continued)

FOREIGN PATENT DOCUMENTS

DE 10 2005 033 048 B3 1/2007
EP 1 762 490 A1 3/2007

*Primary Examiner* — Terrell McKinnon
*Assistant Examiner* — Monica Millner
(74) *Attorney, Agent, or Firm* — Sughrue Mion, PLLC

(57) ABSTRACT

The system comprising a base (2) having attachment means (3) which are movable between a retracted position for fitting/dismantling the seat and an active position for attachment of the seat, by an operating lever (4) which is movable between a retracted fitting/dismantling position and an active position for blocking of the attachment means and which has means (6) for articulation with the base (2) and disengageable means (8) for locking the lever in the active position, is characterized in that the locking means comprise means in the form of a catch (9) which are carried by the lever or the base and are suitable for cooperation, in the active position, with holding means (10) of the base or of the lever in order to lock the lever (4) in the active position, the means in the form of a catch (9) being resiliently deformable in order to allow them to pass over the holding means (10) and engage in the locking position and to be freed therefrom under the action of rotary operating means (18).

7 Claims, 2 Drawing Sheets

U.S. PATENT DOCUMENTS

Figure 1:
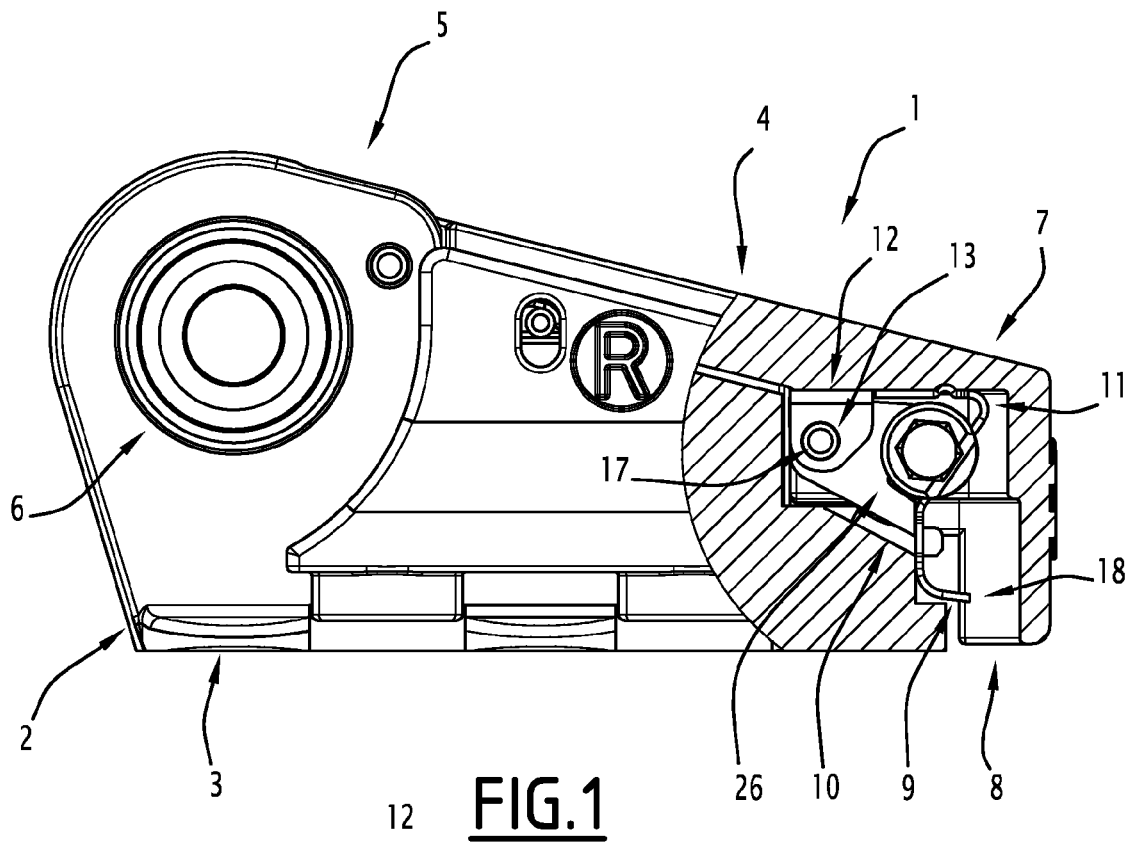

2007/0018047 A1 1/2007 Wodak
2007/0065248 A1* 3/2007 Legeay .................. 410/105
2010/0090060 A1* 4/2010 Marechal .................. 244/118.6

* cited by examiner

FIXING SYSTEM FOR A SEAT, FOR EXAMPLE AN AIRCRAFT SEAT

The present invention relates to a fixing system for a seat, in particular an aircraft seat.

More particularly, the invention relates to such a system comprising a base which is associated with the rest of the seat and is provided with means for attaching the seat to the rest of the aircraft, which means are movable between a retracted position for fitting/dismantling the seat and an active position for attachment of the seat, by way of an operating lever which is movable between a retracted fitting/dismantling position and an active position for blocking the attachment means in position and one end of which has means for articulation with the base and the other end of which has disengageable means for locking the lever in the active blocking position.

In the prior art, such systems are known in which the disengageable means for locking the lever in the active blocking position comprise a pin which is carried by the base and is associated with resilient urging means, the pin being suitable for engagement in a hole in the end of the lever in order to block the lever in the blocking position of the lever.

The hole passes through the end of the lever so that, in order to unlock the lever, it is appropriate to insert a tool into the hole in order to push back the pin and therefore disengage it from the hole in the lever, which allows the lever to be freed of the pin and therefore be released.

It will be understood, however, that this structure has a number of disadvantages, especially in terms of the reliability of the locking of the lever in the active position.

The object of the invention is, therefore, to solve those problems.

To that end, the invention relates to a fixing system for a seat, for example an aircraft seat, of the type comprising a base which is associated with the rest of the seat and has means for attaching the seat to the rest of the aircraft, which means are movable between a retracted position for fitting/dismantling the seat and an active position for attachment of the seat, by way of an operating lever which is movable between a retracted fitting/dismantling position and an active position for blocking the attachment means in position and one end of which has means for articulation with the base and the other end of which has disengageable means for locking in the active blocking position, characterized in that the locking means comprise means in the form of a catch which are carried by one of the members, the lever or the base, and are suitable for cooperation, in the active position, with holding means of the other member, the base or the lever, in order to lock the lever in the active position, the means in the form of a catch being resiliently deformable in order to allow the means in the form of a catch to pass over the holding means and engage in the locking position therewith and to be freed from the holding means under the action of rotary operating means at the time of their disengagement therefrom.

According to other features of the invention, taken separately or in combination:

the means in the form of a catch are in the form of a resilient strip which has at one end folded-back fixing wings provided with holes for the passage of a rod for fixing the strip to the corresponding member, the means in the form of a catch have at the other end of the strip a portion provided with transverse stops suitable for cooperation with complementary projecting portions of the holding means, the resilient strip has a bent intermediate portion comprising an operating zone suitable for cooperation with a portion in the form of a cam of an operating rod of the operating means, the operating rod being rotatably mounted in the corresponding member and having an operating recess suitable for cooperation with an operating member in order to move the means in the form of a catch towards their position of disengagement of the holding means, the portion of the other end of the resilient strip that is provided with transverse stops comprises a ramped portion for passing over the holding means at the time of their engagement in the locking position, the member carrying the means in the form of a catch has stop means therefor, which stop means delimit a stable position thereof from which those means are deformed resiliently in order to engage in or disengage from the holding means, the means in the form of a catch are produced by cutting and shaping a sheet-metal blank, and the means in the form of a catch are carried by the lever, and the holding means are associated with the base.

Figure 2:
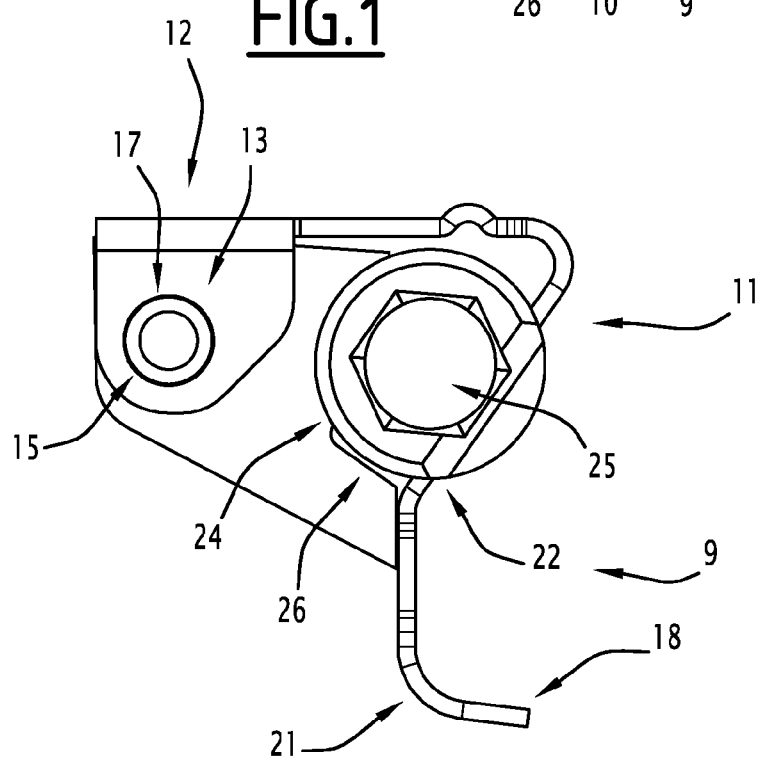
Figure 3:
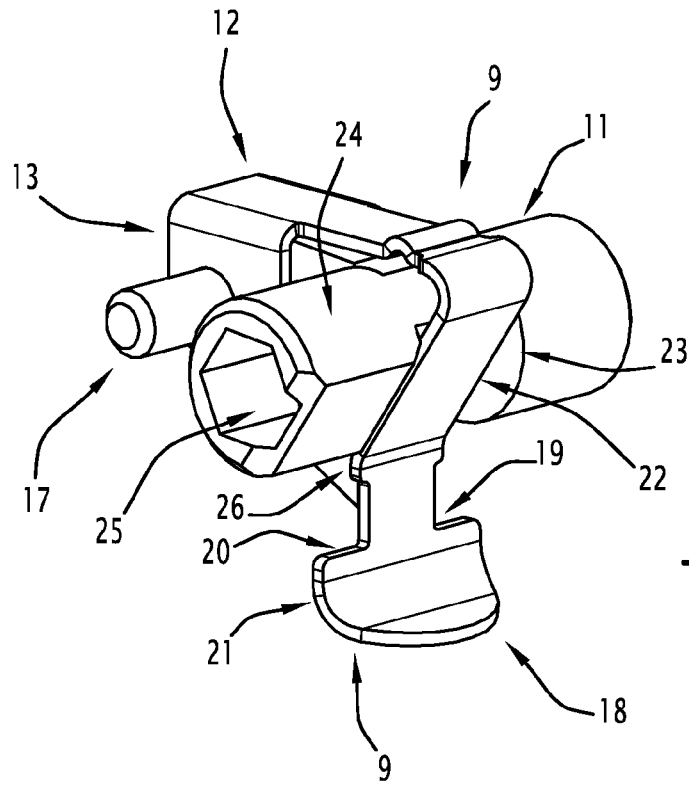
Figure 4:
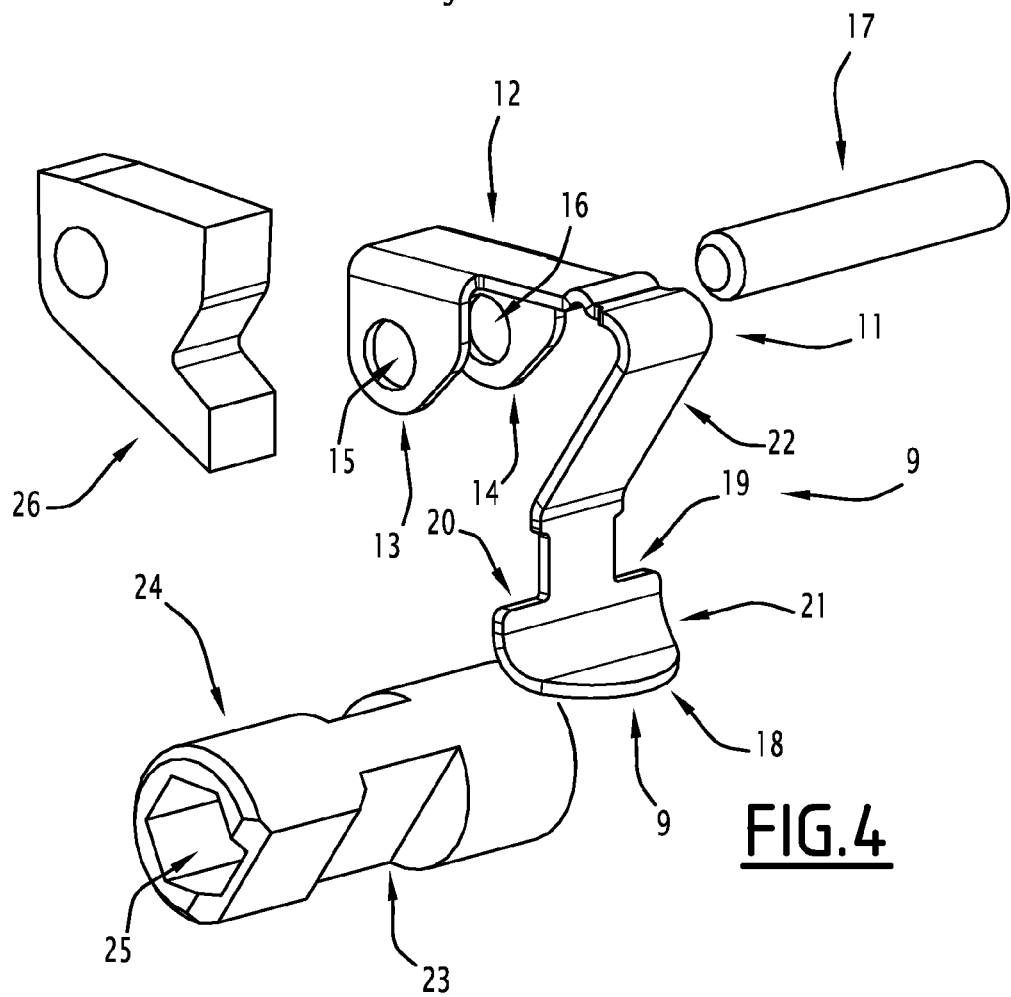

The invention will be better understood with the aid of the following description, which is given solely by way of example and with reference to the accompanying drawings, in which:

FIG. 1 shows a side view of a fixing system according to the invention with a part cut away showing the locking means in the active position of the lever, FIG. 2 shows a detailed side view of the locking means, FIG. 3 shows a perspective view of the locking means, and FIG. 4 shows an exploded view of the locking means.

The figures show a system for fixing a seat, in particular an aircraft seat, to the rest thereof, the system being designated by the general reference numeral 1 in the figures.

The system comprises a base, designated by the general reference numeral 2, which is associated with the rest of the seat and comprises means for attaching the seat to the rest of the aircraft, the attachment means being designated, for example, by the general reference numeral 3.

The attachment means are movable between a retracted position for fitting/dismantling the seat and an active position for attachment of the seat, by way of an operating lever, designated by the general reference numeral 4 in FIG. 1, which is itself movable between a retracted fitting/dismantling position and an active position for blocking the attachment means in position, for example by an operator.

One end of the lever 4, that is to say, for example, its end designated by the general reference numeral 5, has means of articulation with the base 2, which means are constituted, for example, by an articulation rod designated by the general reference numeral 6 in FIG. 1, and the other end of the lever 4 has disengageable means for locking the lever in the active blocking position, the other end of the lever being designated by the general reference numeral 7 and the locking means being designated by the general reference numeral 8.

As is shown in the figures, the locking means 8 comprise means in the form of a catch, designated by the general reference numeral 9 in the figures, which are carried by one of the members, the lever 4 or the base 2, and are suitable for cooperation, in the active position, with holding means of the other member, that is to say the base 2 or the lever 4.

In the figures, the holding means are formed by projecting portions and are designated by the general reference numeral 10.

In the example described, the means in the form of a catch 9 are carried by the corresponding end of the lever 4, while the holding means 10 are associated with the base 2.

It will be understood that an opposite arrangement of these elements can also be envisaged.

It will be understood that the means in the form of a catch 9 are suitable for cooperation with the holding means 10 in order to lock the lever 4 in the active blocking position.

As is shown, the means in the form of a catch 9 are formed by a resiliently deformable strip designated by the general reference numeral 11 in the figures, which allows the means in the form of a catch 9 to pass over the holding means 10 by deflecting resiliently and to be engaged in the locking position with the holding means 10 when the lever is moved towards its active position.

This also allows the means in the form of a catch 9, and more particularly the strip 11, to be freed from the holding means 10 under the action of rotary operating means, at the time of their disengagement therefrom, actuated, for example, by the operator.

As will be seen in the figures, the means in the form of a catch 9 are in the form of the resilient strip and have at one end, such as the end 12, folded-back fixing wings provided with holes for the passage of a rod for fixing the strip to the corresponding member.

The fixing wings are designated by reference numerals 13 and 14 in the figures and in particular in FIG. 4, while the corresponding holes are designated by the general reference numerals 15 and 16 and the fixing rod is designated by the general reference numeral 17.

This allows the means in the form of a catch to be fixed to the corresponding member, in the example described to the lever 4.

At the other end, the strip has a portion, designated by the general reference numeral 18, which is provided with transverse stops 19 and 20 suitable for cooperation with complementary projecting portions of the holding means 10.

It will also be noted that the portion 18 of the strip that is provided with the transverse stops comprises a ramped portion for passing over the holding means at the time of their engagement in the locking position.

The ramped portion is designated by the general reference numeral 21 in the figures.

In its intermediate portion, the resilient strip 11 is bent and comprises an operating zone, designated by the general reference numeral 22, which is suitable for cooperation with a portion in the form of a cam 23 of an operating rod 24 of the operating means.

As is shown in the figures, the operating rod 24 is rotatably mounted in the corresponding member, such as, for example, in the lever 4, and has, for example, at one end an operating recess, designated by the general reference numeral 25, which is suitable for cooperation with an operating member which can be actuated, for example, by an operator with the aid of a corresponding tool, in order to move the means in the form of a catch 9 and the strip 11 towards their position for disengagement of the holding means.

It will be understood that, by means of a simple rotary movement of the rod 24, the portion thereof in the form of a cam 23 pushes back the operating zone 22 of the strip 11 so that it is pushed back and is deflected, while at the same time pivoting slightly, in order to free itself from the holding means 10.

It will be noted that the member carrying the means in the form of a catch 9, such as, for example, the lever 4, also has stop means for the resilient strip. The stop means are designated by the general reference numeral 25 in the figures and allow a stable position thereof to be delimited, from which the strip is deformed resiliently so that it engages in or is disengaged from the holding means.

It will also be noted that, in the example described, the operating recess 25 of the rod 24 is constituted by a hexagonal socket at the end of the rod, suitable for cooperation with a complementary tool.

Of course, it goes without saying that other embodiments can be envisaged.

It will be understood that, during the movement of the lever 4 towards its active locking position, the portion in the form of a ramp 21 of the corresponding end of the resilient strip 11 passes over the corresponding holding means 10, the strip being deformed resiliently in order to allow the corresponding end of the strip to pass over the holding means 10 and the transverse stops of that end of the strip to engage behind the complementary projecting portions of the holding means 10.

In this position, the means in the form of a catch lock the lever 4 in the blocking position.

When it is appropriate to unlock the lever 4, it is then sufficient to insert a corresponding operating member into the recess 25 at the end of the operating rod 24 and pivot the rod slightly, and therefore the portion thereof in the form of a cam 23, in order to push back the resilient rod 11, which allows the transverse stops 19 and 20 to be disengaged from the corresponding holding means and therefore moved away from them in order to free the lever 4 and allow it to move towards its retracted unlocking position.

Of course, it goes without saying that yet other embodiments can be envisaged.

It will simply be noted that, in the example described, the means in the form of a catch are produced by cutting and shaping a sheet-metal blank in the form of a bent resilient strip and that, although in the example described the means in the form of a catch are carried by the lever and the holding means are associated with the base, the reverse may also be envisaged.

Finally, different structures of the means for attaching the base to the aircraft can be envisaged, whether they be means having a rail, a pin, etc.

The invention claimed is:

1. A system for fixing a seat, the system comprising:
a base (2) which is associated with the rest of the seat and which has means (3) for attaching the seat to the rest of the aircraft, which means are movable between a retracted position for fitting/dismantling the seat and an active position for attachment of the seat, by way of an operating lever (4) which is movable between a retracted fitting/dismantling position and an active position for blocking the attachment means in position and one end (5) of which has means (6) for articulation with the base (2) and the other end (7) of which has disengageable means (8) for locking in the active blocking position,
wherein the locking means (8) comprises a catch (9) which is carried by one of the lever or the base, and is configured to cooperate, in the active position, with holding means (10) of the other of the base (2) or the lever (4), in order to lock the lever in the active position, the catch (9) being resiliently deformable in order to allow the catch (9) to pass over the holding means (10) and engage in the locking position therewith and to be freed from the holding means (10) under the action of rotary operating means (22, 23, 24, 25) at the time of their disengagement therefrom,
wherein the catch (9) is in the form of a resilient strip (11) which has at one end folded-back fixing wings (13, 14) provided with holes (15, 16) for the passage of a rod (17) for fixing the strip to the corresponding member.

2. The system for fixing a seat according to claim 1, wherein the catch (9) has at the other end of the strip (11) a portion (18) provided with transverse stops (19, 20) suitable for cooperation with complementary projecting portions of the holding means (10).

3. The system for fixing a seat according to claim 2, wherein the resilient strip (11) has a bent intermediate portion comprising an operating zone (22) suitable for cooperation with a a cam (23) of an operating rod (24) of the operating means, the operating rod (24) being rotatably mounted in the corresponding member and having an operating recess (25) suitable for cooperation with an operating member in order to move the catch (9) towards its position of disengagement of the holding means.

4. The system for fixing a seat according to claim 2, wherein the portion (18) of the other end of the resilient strip that is provided with transverse stops (19, 20) comprises a ramped portion (21) for passing over the holding means (10) at the time of their engagement in the locking position.

5. The system for fixing a seat according to claim 1, wherein the member carrying the catch (9) has stop means (26) therefor, which stop means (26) delimit a stable position thereof from which those means are deformed resiliently in order to engage in or disengage from the holding means.

6. The system for fixing a seat according to claim 1, wherein the catch (9) is produced by cutting and shaping a sheet-metal blank.

7. The system for fixing a seat according to claim 1, wherein the catch (9) is carried by the lever (4), and the holding means (10) are associated with the base (2).

* * * * *